US005636443A

United States Patent [19]
Lindén

[11] Patent Number: 5,636,443
[45] Date of Patent: *Jun. 10, 1997

[54] SNIPS

[75] Inventor: Erkki O. Lindén, Billnäs, Finland

[73] Assignee: Fiskars OY AB, Helsinki, Finland

[ * ] Notice: The term of this patent shall not extend beyond the expiration date of Pat. No. 5,426,857.

[21] Appl. No.: 472,993

[22] Filed: Jun. 7, 1995

Related U.S. Application Data

[63] Continuation-in-part of Ser. No. 217,916, Mar. 25, 1994, Pat. No. 5,426,857, which is a continuation-in-part of Ser. No. 23,811, Feb. 26, 1993, Pat. No. 5,325,592, which is a continuation-in-part of Ser. No. 986,057, Nov. 30, 1992, Pat. No. 5,341,573.

[51] Int. Cl.⁶ .................................................. B26B 13/00
[52] U.S. Cl. ........................ 30/134; 130/124; 76/106.5
[58] Field of Search ........................ 30/134, 135, 186, 30/254, 124; 76/106.5, 104.1

[56] References Cited

U.S. PATENT DOCUMENTS

| | | | |
|---|---|---|---|
| 594,072 | 11/1897 | Forde | 30/134 |
| 614,167 | 11/1898 | Gardella et al. | |
| 887,494 | 5/1908 | Mulertz | |
| 1,458,878 | 6/1923 | Dexter | |
| 1,862,556 | 8/1932 | Welhaven | |
| 2,553,697 | 5/1951 | Zacrep | 30/135 |
| 3,336,667 | 8/1967 | Wallace et al. | 30/135 |
| 3,750,282 | 8/1973 | Eaton et al. | 30/254 |
| 4,534,109 | 8/1985 | Bush et al. | 30/254 X |
| 4,715,122 | 12/1987 | Linden | 30/254 |
| 5,117,557 | 6/1992 | Hartley | 30/135 |
| 5,179,783 | 1/1993 | Melter | 30/254 X |
| 5,325,592 | 7/1994 | Linden et al. | 30/254 X |
| 5,341,573 | 8/1994 | Linden et al. | 30/254 |
| 5,426,857 | 6/1995 | Linden | 30/254 X |

FOREIGN PATENT DOCUMENTS 599017  3/1948  United Kingdom ..................... 30/134

OTHER PUBLICATIONS

Stanley Model No. 70–005 (Copies of photographs of Stanley item).

*Primary Examiner*—Hwei-siu Payer
*Attorney, Agent, or Firm*—Foley & Lardner

[57] ABSTRACT

A pair of snips including first and second, opposed, elongated members, each member comprising a jaw at a front end portion thereof, a handle at a rear end portion thereof, and a midportion where the members cross over each other. A pivot unites the midportions for scissor-like movement of the handles and jaws about the pivot. The snips also includes a gripper biasely connected to the handle of one of the members to retain a portion of a workpiece severed by the snips. The first member includes a metal plate having a forwardly extending blade which comprises one of the jaws and a rearwardly extending tang. According to the invention, at least the handle of the first member and gripper are made of a moldable material molded onto the metal plate, such that the handle of the first member is molded onto the tang of the metal plate and the gripper is integral with the first member and molded onto an outer surface of the plate. The moldable material is most preferably a plastic, but other moldable substances could be employed.

23 Claims, 5 Drawing Sheets

SNIPS

CROSS-REFERENCE TO RELATED APPLICATIONS

This is a continuation-in-part application of co-pending U.S. patent application Ser. No. 08/217,916, filed Mar. 25, 1994, now U.S. Pat. No. 5,426,857 which is a continuation-in-part application of U.S. patent application Ser. No. 08/023,811, filed Feb. 26, 1993, now U.S. Pat. No. 5,325,592, which is a continuation-in-part application of U.S. patent application Ser. No. 07/986,057, filed Nov. 30, 1992, now U.S. Pat. No. 5,341,573.

FIELD OF THE INVENTION

The present invention relates generally to hand-held cutting tools, particularly to pruning snips.

BACKGROUND OF THE INVENTION

Pivoted implements having elongated members disposed for cooperative engagement about a pivotable joint are widely used. In particular, pivoted tools such as "anvil-type" pruning snips generally comprise two elongated members disposed for cooperative engagement about a pivotable joint, each member having a jaw and an opposed force-applying end. One member, which is typically made of stamped or forged metal or other suitable material, includes a jaw formed as a blade and a tang at the opposed force-applying end. A handle preferably made of moldable material is formed onto the tang, conforming to the fingers or hands of the user. The other member includes a jaw formed as an anvil and a handle at the opposed force-applying end. Upon scissor-action of the handles, the blade cooperates with the anvil to perform the desired cutting operation.

Pruning snips of the type used to cut flowers, fruit, or the like, are often conveniently provided with a retaining member or "gripper". The gripper is adapted to temporarily but firmly retain the severed portion of a workpiece, such as the stem of the fruit or flower, after the cutting operation is completed. This prevents damaging the fruit or flower that would most likely result if the severed portion of the fruit or flower was dropped after being cut. Snips provided with a gripping feature are particularly useful when the user has to brace himself or herself with one hand, while using the snips with the other hand.

Examples of prior art pruning snips provided with a gripper are described in U.S. Pat. No. 3,336,667 issued Aug. 22, 1967 to Wallace et al., and in U.S. Pat. No. 2,553,697 issued May 22, 1951 to Zacrep. Wallace discloses the use of a spring biased member 92 pivoted about pivot 18. On the other hand, Zacrep discloses the use of a unitary wire member configured to permit attachment to pivot point 15 of the snips. The wire member also includes gripping arms 18 and 19 provided with extensions 20 and 21 extending laterally about cutting jaws 13 to grip the portion of the stem being severed. In more recent prior art snips, the unitary wire member is made out of plastic and is connected to the snips at the pivot of the snips.

While snips of the type described in the foregoing suitably perform the desired gripping function, it can be readily appreciated that these prior art structures have several shortcomings. First, these snips typically include various components which require in some cases several manufacturing steps, followed by their attachment to the snips. In addition, since snips are normally used with live growths, the sap of the plant being pruned will likely enter the gripper mechanism and interfere with its desired operation. It will therefore be necessary to disassemble these components to clean the gripper. Finally, while a unitary wire structure of the type disclosed by Zacrep offers the obvious advantage of including only one component, thereby potentially reducing the cost of that feature and facilitating cleaning the tool after normal usage, its exposed structure makes it prone to being caught in the foliage through which snips are typically guided by the user.

In light of the foregoing, it appears desirable to provide a pruning snips having a gripper which can alleviate the problems associated with conventional items of that kind, i.e., which includes fewer components to reduce its cost and facilitate its disassembly, and which is configured such that it is less susceptible to being caught in congested foliage areas.

It can also be recognized that prior art methods used to manufacture snips have certain obvious disadvantages. These methods typically require assembling two members which have been previously manufactured separately and installing the components of the gripping mechanism, thereby increasing material handling requirements which generally translates into higher unit cost.

In cases where the snips are provided with molded handles, conventional molding operations consist of positioning a jaw (i.e., the blade) having an aperture in a suitable cavity of a mold wherein the jaw is fixed in position with respect to the mold. The mold cavity is subsequently filled with a fluid plastic material or the like, whereby the plastic material surrounds the tang of the jaw so that the handle is molded onto the tang. The same operation is separately repeated to form the handle of the other member. The two handle sub-assemblies are then inventoried as required. As at least one additional operation, the components of the gripper are formed. To assemble the snips, the operator brings the apertures of the jaw/handle sub-assemblies into registration to install a separate pivot member, typically including a fastener, maintaining the jaws in cooperative assembled relationship about the pivotable joint. The gripper is also installed prior to fastening the members together.

Thus, the foregoing also indicates that, not only is it desirable to provide snips with fewer components less prone to being caught in heavy foliage areas, it is also desirable to provide snips which are engineered to lend themselves to functional assembling during, as opposed to subsequent to, the manufacturing process, or which otherwise reduce the number of operations required to manufacture these tools, while having all necessary features typically desired by users of these tools.

SUMMARY OF THE INVENTION

The present invention facilitates the manufacturing of pruning snips provided with a gripping feature by simplifying the manufacturing process and eliminating secondary assembly operations typically required with such tools, and by improving, or at least maintaining, the functional quality of these tools. A method for making snips in accordance with the invention is characterized in that a metal plate including a jaw is disposed in a cavity of a mold section to which an uncured or otherwise flowable polymer, copolymer or the like is supplied, as by injection, to form a handle at the force-applying end of the jaw and the gripper. The flowable material is also supplied to a second mold section to form the second elongated member as an integral, unitary member comprising the anvil, the pivot post, and the handle. Accordingly, tools in accordance with the invention can be constructed without requiring post manufacturing assembling operations, other than positioning the gripper so that it can be guided by the blade, as will be explained below.

Snips according to one aspect of the invention include a pair of opposed elongated members, each member comprising a jaw at a front end portion thereof, a handle at a rear end portion thereof, and a midportion where the members cross over each other. A pivot unites the midportions for scissor-like movement of the handles and jaws about the pivot. According to the invention, at least one of the members includes a metal plate having a forwardly extending blade which comprises one of the jaws, a rearwardly extending tang, and a gripper formed integrally with the handle of that member.

According to another aspect of this invention, the handles, pivot, and gripper are each made of a moldable material molded onto the metal plate. One of the handles is molded onto the tang of the metal plate and includes the gripper extending over the plate from the tang region of that handle. The pivot is formed integrally with the other member and extends through a central aperture in the metal plate. The moldable material is most preferably a plastic, but other moldable substances could be employed.

According to a further embodiment of the invention, the snips has a jaw with a molded handle and an anvil integrally molded with its associated handle, and the pivotable joint comprises a fastener and a pivot member. The pivot member is molded as an integral part of one of the handles, and the fastener and pivot member cooperate to permit functional adjustment of the tool.

According to yet another aspect of the invention, the metal plate has a curved edge on a midportion thereof between the blade and the tang. The curved edge defines a sector having a center which is offset from a center of the pivot, and the second member has a wall which comes into engagement with the curved edge as the tool opens, thereby limiting the extent to which the tool can open.

A preferred method for making snips provided with a gripper according to the invention includes the steps of positioning into a mold a metal plate having a forwardly extending blade which comprises one of the jaws and a rearwardly extending tang, then molding the handles, pivot and gripper onto the metal plate using a moldable plastic, such that one of the handles is molded onto the tang of the metal plate to form the first elongated member and includes the gripper formed integrally therewith, and the pivot extends through a central aperture in the metal plate.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and.

DETAILED DESCRIPTION OF A PREFERRED EXEMPLARY EMBODIMENT

The invention relates to pivoted tools having elongated members disposed for cooperative engagement about a pivotable joint wherein a force applied to the force-applying end of the tool is transmitted through the pivotable joint to the opposed working end of the elongated members and transferred to an item or workpiece engaging the jaws of the tool.

Figure 1:
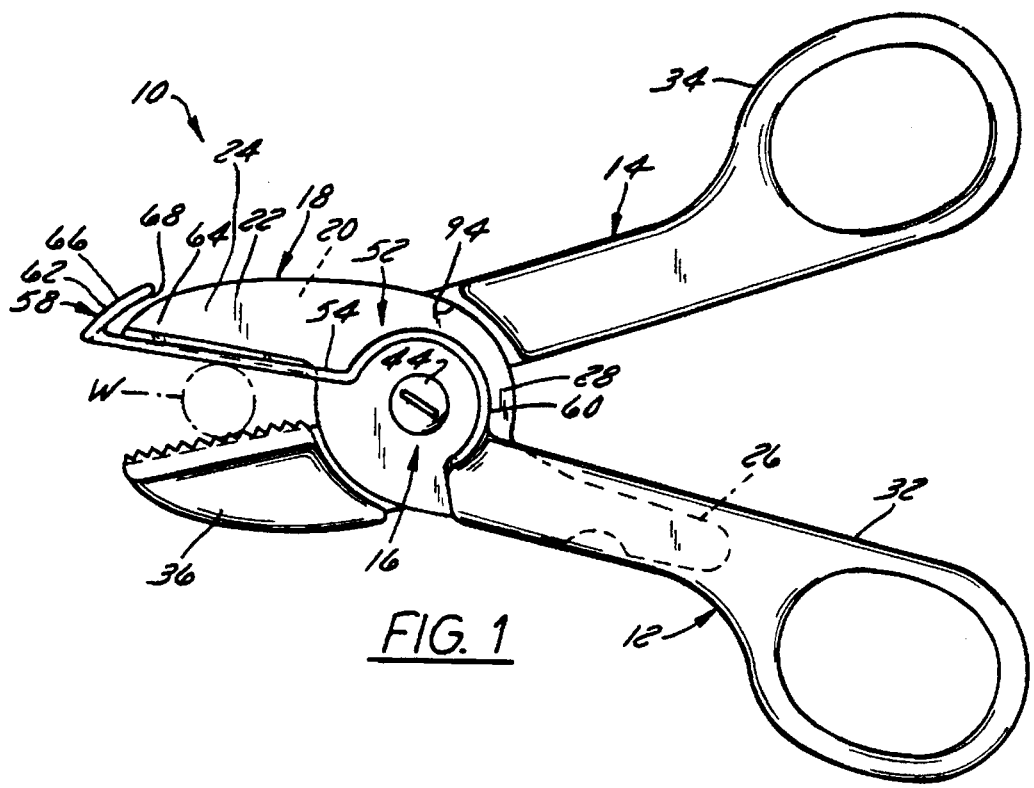
FIG. 1 is a top plan view of a pair of snips in accordance with one aspect of the invention, shown in open position with a workpiece held between the jaws of the snips.
Figure 2:
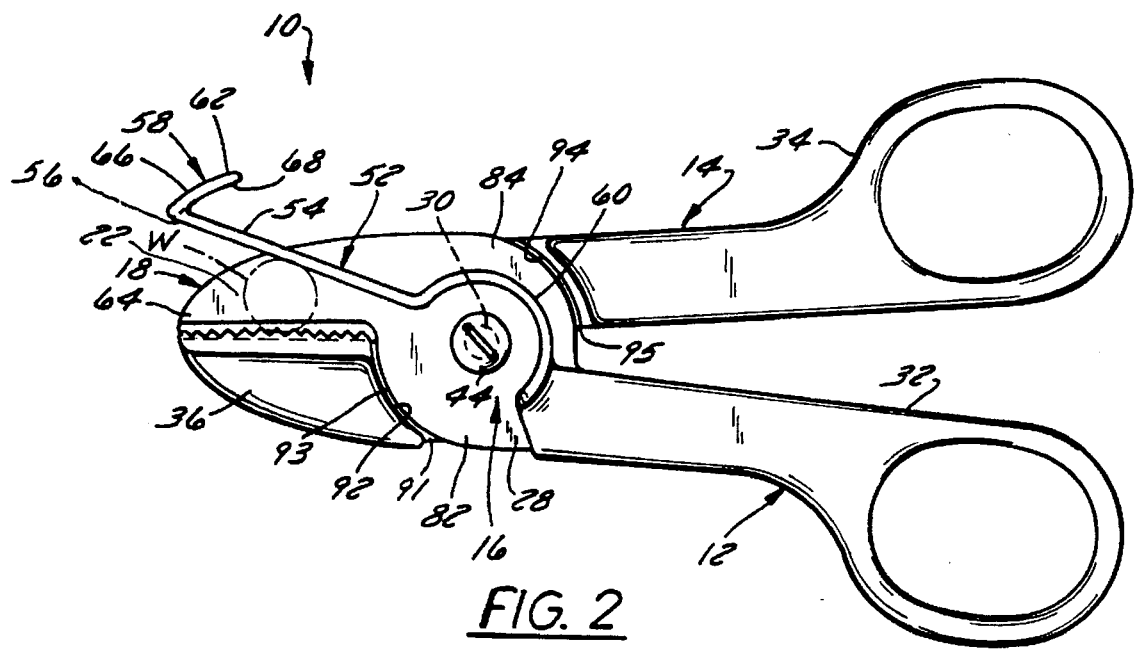
FIG. 2 is a top plan view of the snips of FIG. 1, shown in closed position, with the severed portion of the workpiece retained by the gripper.
Figure 3:
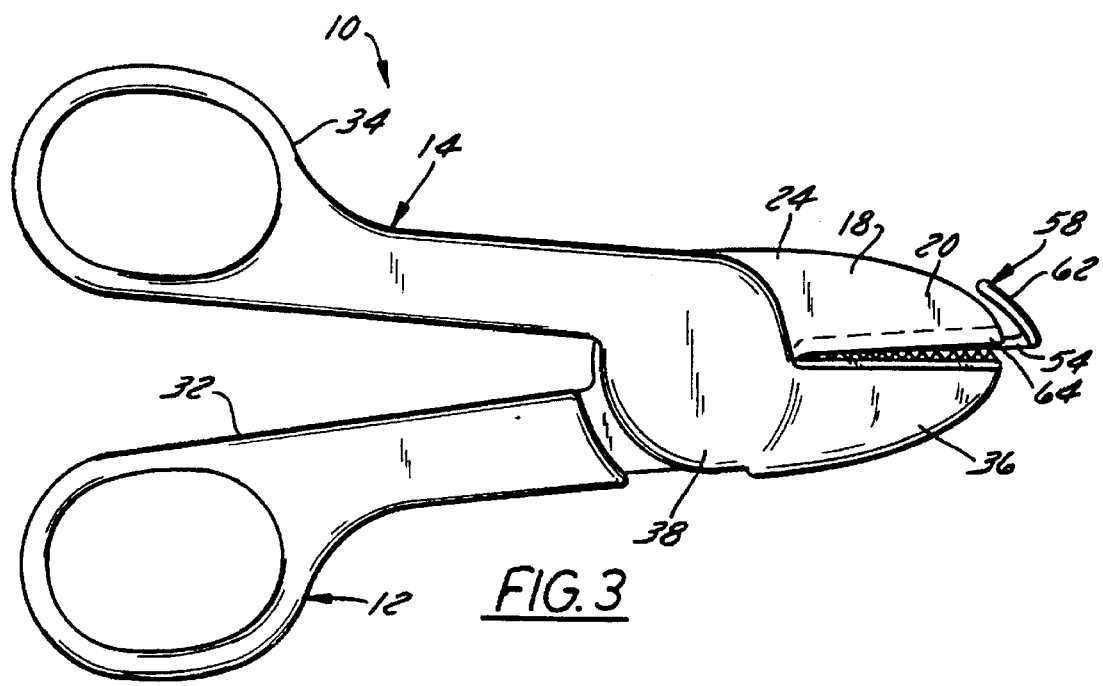
FIG. 3 is a bottom plan view of the snips of FIG. 2.
Figure 4:
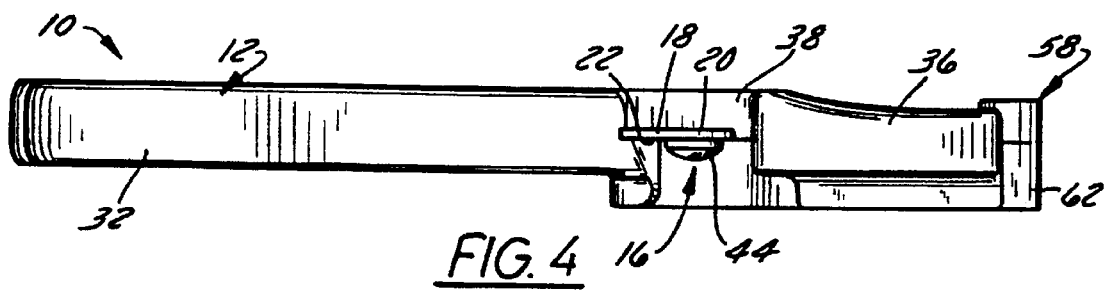
FIG. 4 is a front elevational view of the snips of FIG. 3.
Figure 5:
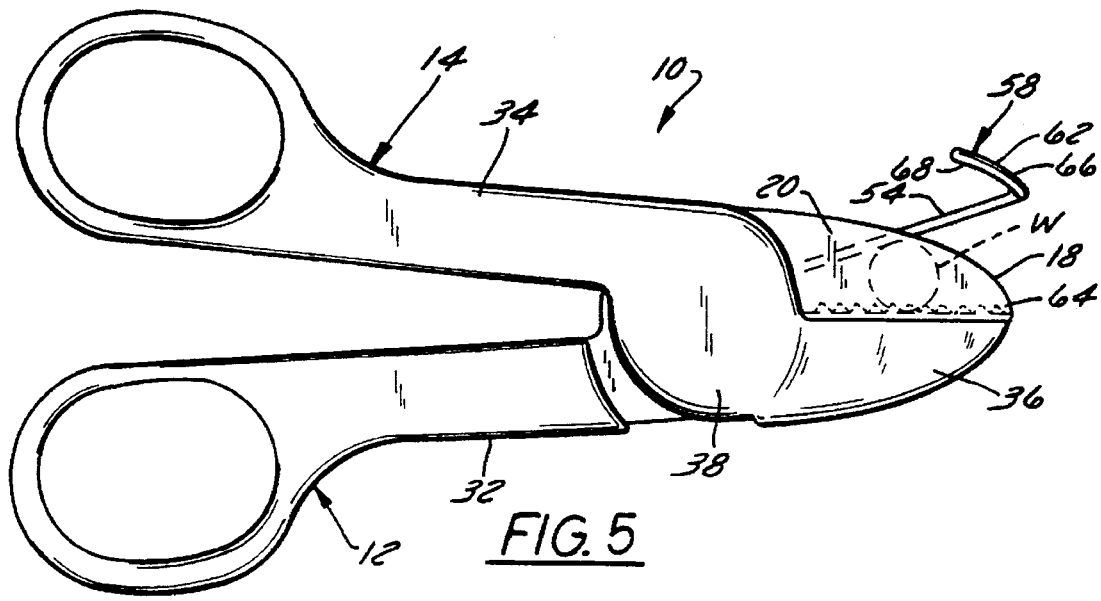
FIG. 5 is a bottom plan view of the snips of FIG. 2, with the severed portion of the workpiece retained by the gripper.
Figure 6:
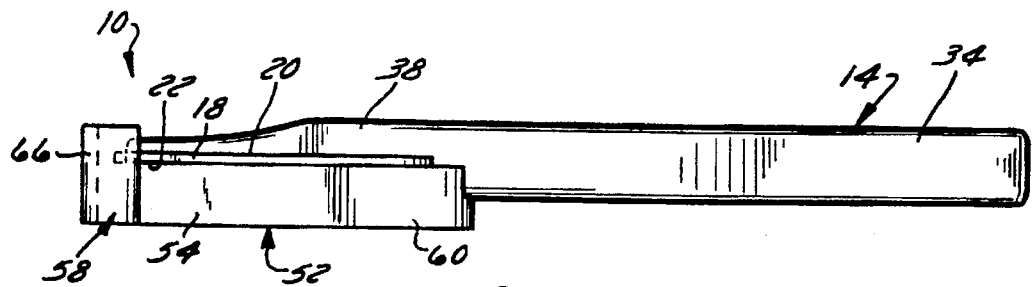
FIG. 6 is a rear elevational view of the snips of FIG. 3.

Referring to FIGS. 1–5, a pair of snips 10 according to the invention includes first and second elongated members 12 and 14, respectively, joined for scissor-action about a pivotable joint 16. Elongated member 12 includes a steel plate 18 having an inner surface 20 and a spaced outer surface 22. Plate 18 comprises a first jaw 24 in the form of a cutting blade, an opposed force-applying end or tang 26, and a midportion or pivot region 28 intermediate jaw 24 and tang 26. Pivot region 28 is provided with a central aperture 30 formed therein. Elongated member 12 also comprises a first handle 32 molded into engagement with tang 26. Referring to FIGS. 3–5, second elongated member 14 is a unitary piece of molded plastic and comprises a second handle 34 joined to a second jaw or anvil 36 by a midportion or bearing region 38.

Figure 10:
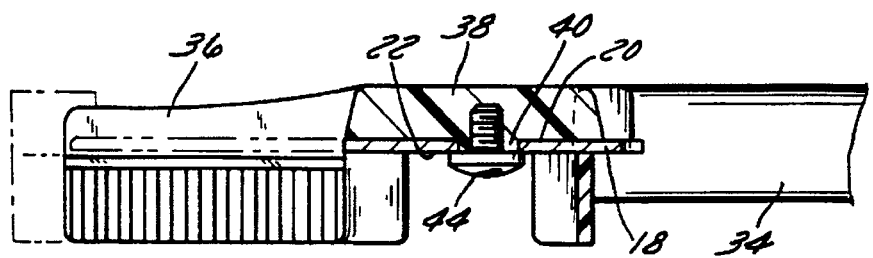
FIG. 10 is a partial sectional view taken along line 10—10 shown in FIG. 7.
Figure 10A:
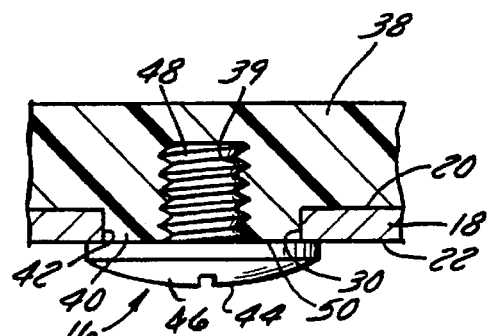
FIG. 10a is an enlarged partial sectional view of the pivot area shown in FIG. 10.
Figure 11:
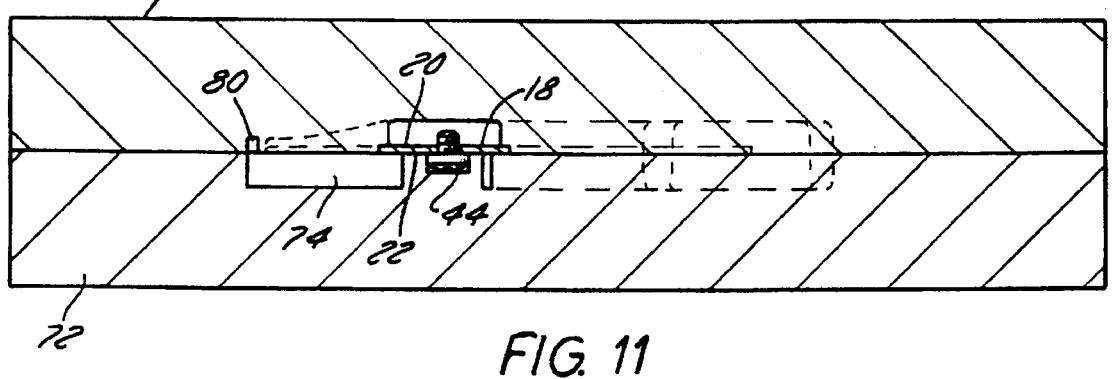
FIG. 11 is a sectional view of the mold used to form the snips of the present invention, with the plate and fastener disposed in cavities of the mold.

Referring more particularly to FIGS. 4, 10 and 10a, pivot 16 comprises a plastic pivot post 40 integrally formed with bearing region 38 which is unitary with handle 34 and jaw 36. Post 40, which is formed in situ, i.e., within the mold cavity receiving plate 18, extends effectively from inner surface 20 through aperture 30 into close conforming engagement with the interior surface 42 of aperture 30. The distal end 50 of post 40 is preferably approximately flush with outer surface 22. Pivot 16 further comprises a fastener such as a screw 44 having an enlarged diameter head 46 and a threaded stem 48 secured in a central threaded hole 39 in post 40. Because post 40 extends only to the juncture of outer surface 22 and aperture 30, head 46 lies adjacent to and is effectively in contact with both outer surface 22 and end 50 of post 40. Screw 44 secures the elongated members 12, 14 together and can be tightened or loosened to control the compressive force applied to elongated members 12, 14 by the pivot mechanism 16. In forming pivot 16, screw 44 may be inserted into the mold cavity in its desired position together with plate 18, so that plastic fills in around it to form threaded hole 39.

Referring to FIGS. 1–9, snips 10 is also provided with a retaining mechanism or gripper generally designated as 52 designed to retain the portion of a workpiece W, such as a flower stem, severed by blade 24. Gripper 52, which is formed integrally with handle 32, comprises a forwardly extending arm 54 terminating at a distal end 56 by an engaging means 58 and merging at the other end into a biasing portion 60. Biasing portion 60, which is connected to handle 32 in the region of midportion 28, is formed as a semi-circular region centered about pivot 16. Biasing portion 60 and arm 54 extend laterally from outer surface 22 by a predetermined distance.

As illustrated in FIGS. 1, 2, 4, and 8, engaging means 58 may be configured as a hook or tab, or other suitable structure, provided with a rearwardly sloping projection or barb 62 having an outer face 66 and an opposed inner face 68. Barb 62, which extends forwardly of blade 24 beyond the tip 64 of blade 24, extends laterally from outer surface 22 by a predetermined distance, but also conveniently extends on the other side of blade 24 beyond inner surface 20. In that way, barb 62 is engaged by blade 24 when inner face 68 comes into contact with tip 64 upon opening snips 10. This results in gripper 52 following the movement of blade 24, thereby clearing the bight formed between blade 24 and jaw 36 to facilitate engagement of workpiece W by snips 10. Those skilled in the art will also recognize that other structures may be used as the engaging means. For example, such means may comprise a post, boss, or conversely a recessed area, suitably cooperating with blade 24, so that gripper 52 follows the opening movement of blade 24, yet gripper 52 is capable of moving separately from blade 24 when gripper 52 retains a severed portion of workpiece W.

Figure 7:
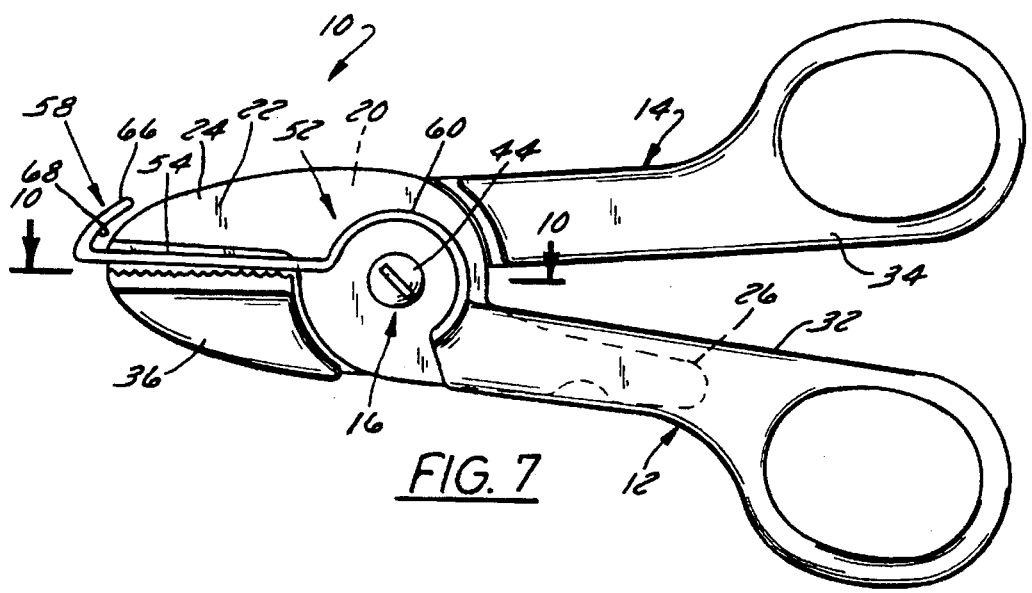
FIG. 7 is top plan view of the snips of FIG. 3.
Figure 8:
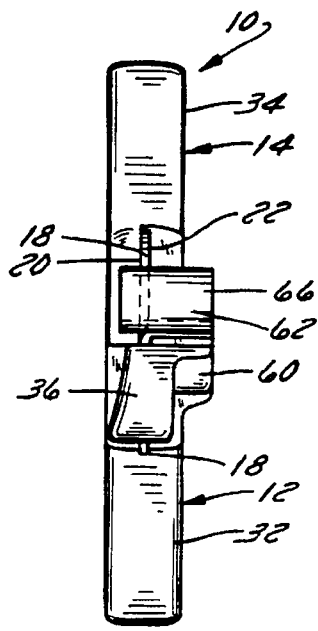
FIG. 8 is a left side elevational view of the snips of FIG. 7.
Figure 9:
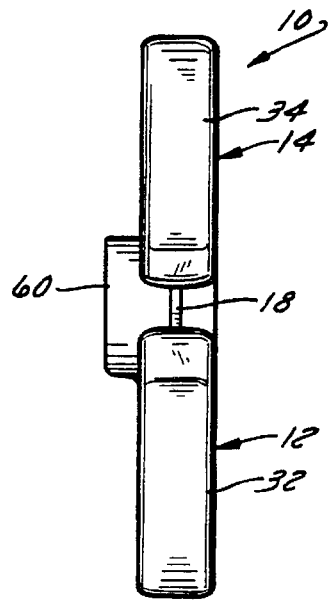
FIG. 9 is a right side elevational view of the snips of FIG. 7.

As shown in FIG. 7, in the rest position of gripper 52, i.e., when snips 10 is closed prior to being used by the user, arm 54 extends in a direction substantially parallel to the longitudinal axis of snips 10, i.e., an axis drawn horizontally in FIG. 7. As explained above, when the user opens handles 12 and 14, gripper 52 follows the movement of blade 24. To sever a portion of workpiece W which is located between blade 24 and jaw 36, the user brings handles 12 and 14 together, thereby resulting in movement of blade 24 toward jaw 36, until blade 24 abuts jaw 36. At that time a portion of workpiece W is severed and snips 10 is closed. However, while blade 24 moves toward jaw 36, the severed portion of workpiece W has deflects arm 54 upwardly, partially overcoming the biasing force of gripper 52 which tends to return arm 54 to its rest position (i.e., parallel to the longitudinal axis of snips 10). As a result, the portion of workpiece W severed by blade 24 is firmly, but temporarily, retained between jaw 36 and arm 54. The user may then open snips 10 by normal scissor-action of handles 12 and 14. When blade 24 reaches the upwardly lifted position of arm 54, inner face 68 is engaged by tip 64, thereby releasing as desired the severed portion of workpiece W.

Referring to FIGS. 1, 2, 13, and 14, gripper 52, which consists of a single plastic piece, is formed in one molding operation in a mold comprising two sections, each section being generally designated as 70, 72. As more particularly shown in FIG. 14, gripper 52 is formed in situ, i.e., within the mold cavity receiving plate 18, as an integral part of handle 32. Accordingly, gripper 52 is formed onto outer surface 22, thereby being effectively in contact, i.e., substantially flush, with outer surface 22 and extends from outer surface 22 by a predetermined distance. To impart the resiliency necessary for gripper 52 to retain between arm 54 and anvil 36 a portion of workpiece W severed by blade 24, gripper 52 is molded with elongated members 12 and 14 in the open position. To that end, a cavity 74 of mold section 72 configured to form gripper 52 is in fluid communication with a cavity 76 configured to form handle 32 and extends between the bight formed between plate 18 and the cavity 78 forming jaw 36. On the other hand, mold section 70 includes a cavity 80 configured to form the portion of barb 62 extending beyond inner surface 20 of plate 18 as explained above. Once snips 10 is removed from mold sections 70 and 72, gripper arm 54 can be lifted away from outer surface 22, sufficiently for gripper 52 to slide over surface 22 until inner barb 62 is moved beyond tip 64 of blade 24. At that time, tip 64 engages inner face 68 of barb 62, thereby permitting movement of gripper 52 with blade 24 when snips 10 is opened to engage workpiece W.

Figure 12:
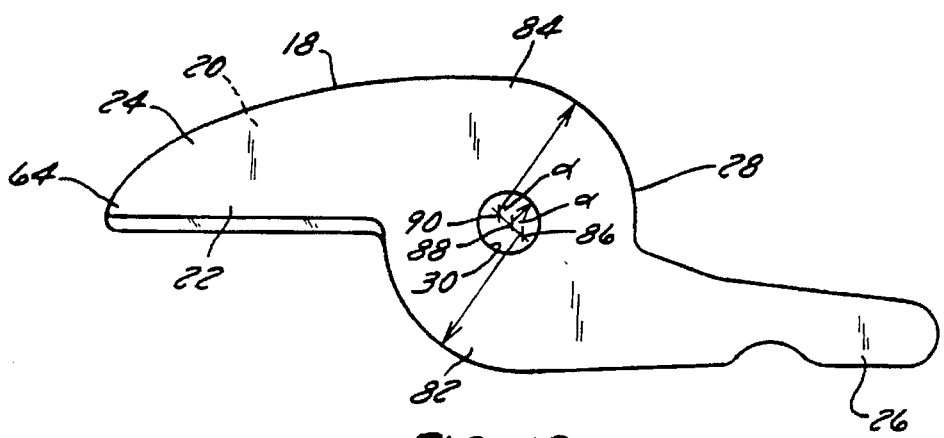
FIG. 12 is a top plan view of the metal plate used with the snips shown in FIG. 1.
Figure 13:
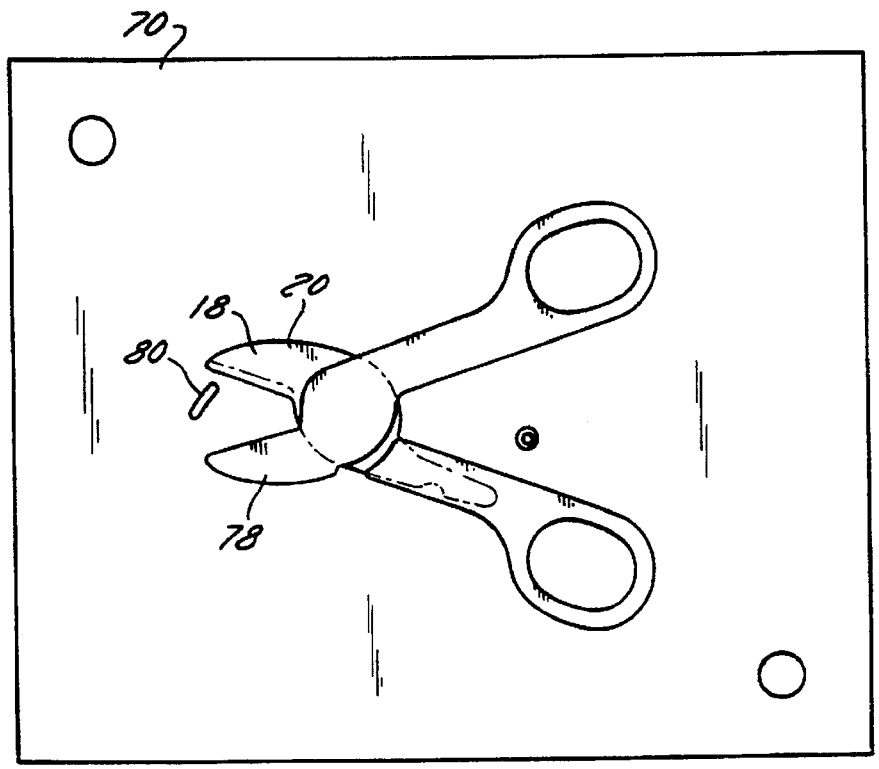
FIG. 13 is a top plan view of one section of a mold for the manufacture of snips shown in FIG. 1.
Figure 14:
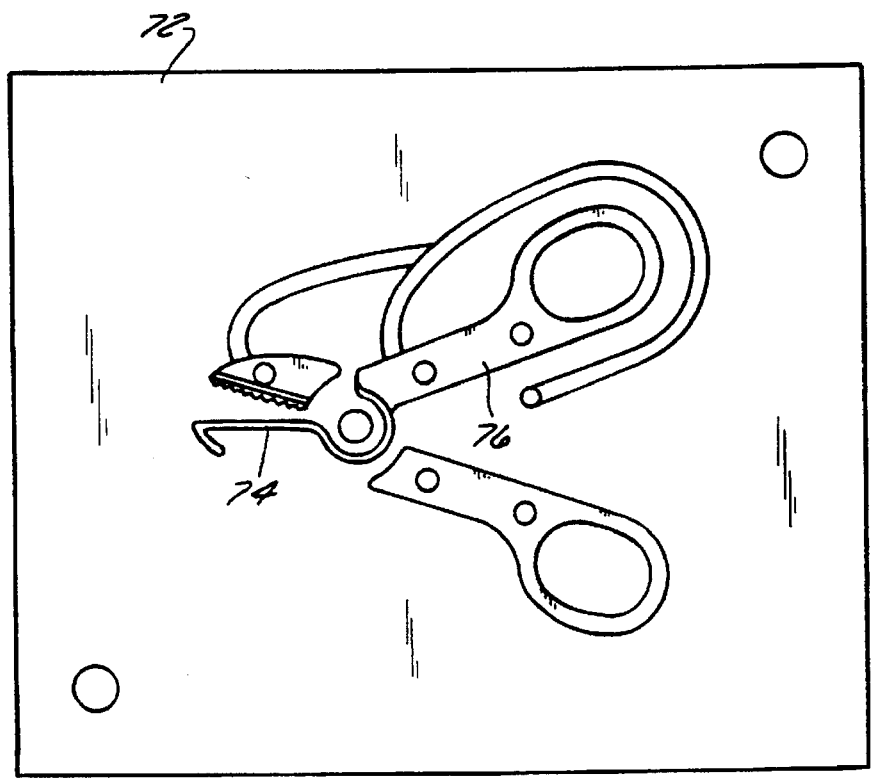
FIG. 14 is a top plan view of the other section of the mold for the manufacture of snips shown in FIG. 1.

Referring now to FIGS. 1, 2, and 12, pivot region 28 of plate 18 comprises first and second sectors 82, 84, respectively, disposed across aperture 30. First sector 82 is arcuate and has its center 86 offset from center 88 of aperture 30 by a distance $\alpha$. Similarly, second sector 84 is arcuate and has its center 90 offset from center 88 by the same distance $\alpha$, but in an opposite direction across center 88. Accordingly, pivot region 28 as a result comprises two oppositely directed eccentric sectors 82 and 84 formed around aperture 30.

Referring now to FIGS. 1 and 2, bearing region 38 includes a recess 91 in which plate 18 is mounted. Recess 91 further has first and second mutually facing arcuate walls 92, 94, respectively, formed on opposite sides of pivot 16. More particularly, arcuate wall 92 is formed near the juncture of second jaw 36 and bearing region 38, while arcuate wall 94 is formed near (just ahead of) the juncture of bearing region 38 and handle 34. In closed position as shown in FIG. 2, arcuate walls 92, 94 are spaced from sectors 82, 84, so that narrow, curved grooves 93, 95 are formed between walls 92, 94 and the curved edges of sectors 82, 84, respectively. Upon opening of snips 10, the curved edge of sector 82 moves into engagement with wall 92 while sector 84 moves into engagement with wall 94, closing grooves 93, 95 due to the eccentric movement of sectors 82, 84 around center 88 rather than centers 86, 90. This limits opening of snips 10 to the position shown in FIG. 1 and prevents the distance between handles 32 and 34 from becoming greater so that the handles can be grasped with one hand when snips 10 is fully open. Only one sector 82 or 84 cooperating with curved wall 92 or 94 is actually needed to limit opening of snips 10.

Pruning snips according to the invention can be manufactured with improved facility, eliminating secondary assembling operations typically required with prior art items of this sort. The manufacturing cost of tools in accordance with the invention is noticeably reduced, and consistency of the appearance and the functional characteristics of these tools can be improved.

It is understood that the above description is of a preferred exemplary embodiment of the invention, and that the invention is not limited to the specific forms described. For example, tools in accordance with the invention having a unitary pivot could comprise a pair of opposed cutting blades, as in by-pass pruners, instead of a blade cooperating with an anvil as described in the preferred embodiment. In such a case, the second blade could be provided with a support structure suitable to cooperate with the gripper to retain the severed portion of a workpiece. Moreover, even though the preferred embodiment of the invention shows a gripper having a particular configuration, those skilled in the art will appreciate that this gripper can be formed in other ways without departing from the scope of this invention. For example, the gripper could be guided by plate 18 at another location, in another manner, so long as the engaging means is configured to permit the gripper to follow the blade opening movement, and so long as the gripper can cooperate with the anvil or other structure to retain the severed portion of a workpiece. Such other constructions are considered to be within the scope of this invention. These and other substitutions, modifications, changes and omissions may be made in the design and arrangement of the elements and in the manufacturing steps disclosed herein without departing from the scope of the appended claims.

I claim:

1. A pair of snips, comprising:

first and second, opposed, elongated members, each member comprising a jaw at a front end portion thereof, a handle at a rear end portion thereof, and a midportion where the members cross over each other, the first elongated member including a metal plate having a forwardly extending blade which comprises one of the jaws and a rearwardly extending tang, the handle of the first member being made of a moldable material molded onto the tang of the metal plate, the jaw of the second elongated member including an anvil configured for engagement with the blade;

a pivot which unites the midportions for scissor movement of the handles and jaws about the pivot; and a gripper biasely connected to the first member and formed integrally therewith, the gripper being molded onto an outer surface of the metal plate so that at least a portion of the gripper is effectively in contact and substantially flush therewith, the gripper cooperating with the anvil to retain a portion of a workpiece severed by the blade.

2. The snips of claim 1, wherein the gripper comprises a forwardly extending arm connected to the first member by a biasing portion and terminating at an opposed distal end by a hook engageable by the blade.

3. The snips of claim 2, wherein the biasing portion comprises a substantially circular region centered about the pivot.

4. The snips of claim 2, wherein the blade has a tip and the hook has oppositely facing inner and outer faces, the inner face being engaged by the tip when the snips are opened by a user.

5. The snips of claim 1, wherein the pivot comprises a round post integral with the second member and cooperating with a headed fastener to unite the midportions.

6. The snips of claim 5, wherein the round post has an axial opening therein, and the fastener is secured in the axial opening in engagement with the metal plate to secure the first and second elongated members together.

7. The snips of claim 6, wherein the fastener comprises a screw, and the axial opening is threaded for receiving the screw therein in a manner effective to control compressive force applied to the elongated members by the pivot.

8. A pair of snips, comprising:

first and second opposed elongated members, each member comprising a jaw at a front end portion thereof, a handle at a rear end portion thereof, and a midportion where the members cross over each other, the first elongated member including a metal plate having oppositely facing inner and outer surfaces, a forwardly extending blade which constitutes one of the jaws, and a rearwardly extending tang, the handle of the first member being made of a moldable material molded onto the tang of the metal plate; and a pivot made of a moldable material molded in a central aperture in the metal plate, the pivot including a round post integral with the second member and extending from the inner surface of the plate through the central aperture into close conforming engagement with an interior surface thereof to a point lying proximate but below the outer surface, the pivot uniting the midportions for scissor movement of the handles and jaws about the pivot.

9. The snips of claim 8, wherein the moldable material is a plastic and the second elongated member is made of plastic, the jaw thereof comprising an anvil configured for engagement with the blade, and the post cooperates with a headed fastener to releasably unite the midportions.

10. The snips of claim 8, further comprising a gripper biasely connected to the first member, the jaw of the second elongated member comprising an anvil configured for engagement with the blade, the gripper cooperating with the anvil to retain a portion of a workpiece severed by the blade.

11. The snips of claim 10, wherein the anvil includes a serrated portion cooperating with the gripper to increase retention of the workpiece within the jaws.

12. The snips of claim 10, wherein the gripper is integral with the first member and includes a forwardly extending arm terminating at a distal end.

13. The snips of claim 12, wherein the gripper includes means for removably engaging the blade to permit movement of the gripper with the blade during scissor-action of the members and to limit interference of the gripper with the workpiece when the jaws are positioned about the workpiece.

14. The snips of claim 13, wherein the engaging means comprises a hook formed at the distal end of the gripper.

15. The snips of claim 12, wherein the gripper comprises a substantially semi-circular biasing portion merging into the first member.

16. The snips of claim 15, wherein the biasing portion is centered about the pivot.

17. The snips of claim 15, wherein the biasing portion extends laterally from the outer surface by a predetermined distance.

18. The snips of claim 17, wherein the moldable material is a plastic.

19. The snips of claim 8, wherein the metal plate has a curved edge on a midportion thereof between the blade and the tang, which curved edge defines a sector having a center which is offset from a center of the pivot, and the second member has a wall which comes into engagement with the curved edge as the snips open, thereby limiting the extent to which the snips can open.

20. The snips of claim 19, wherein the the wall coming into engagement with the curved edge is located near the front of the handle of the second elongated member and has a curvature similar to that of the curved edge.

21. A method for making snips of the type having a gripper, the snips including first and second opposed elongated members, each member comprising a jaw at a front end portion thereof, a handle at a rear end portion thereof and a midportion where the members cross over each other, a pivot uniting the midportions for scissor movement of the handles and jaws about the pivot, the gripper being biasely connected to the first member and cooperating with the jaw of the second member to retain a portion of a workpiece severed by the snips, the method comprising:

positioning a metal plate into a mold, the metal plate having spaced apart inner and outer surfaces, a forwardly extending blade which constitutes the jaw of the first member, and a rearwardly extending tang; and molding the handle of the first member and gripper onto the metal plate using a moldable plastic such that the handle of the first member is molded onto the tang of the metal plate to form the first elongated member and the gripper is molded integrally with the first member.

22. The method of claim 21, wherein the molding step further comprises molding the second elongated member entirely of plastic, the jaw thereof comprising an anvil configured for engagement with the blade, and the pivot comprises a rounded post integral with the second member, which post is formed by filling in a central aperture in the metal plate.

23. The method of claim 21 wherein the gripper includes a hook at a distal end thereof, the mold further comprising a pair of mold sections including cavities disposed on opposite sides of the plate for forming the hook.

* * * * *